United States Patent [19]
Hirose

[11] Patent Number: 4,663,638
[45] Date of Patent: May 5, 1987

[54] RECORDING APPARATUS AND METHOD OF TRANSPORTING RECORDING PAPER

[75] Inventor: Kunihiko Hirose, Chofu, Japan

[73] Assignee: Kabushiki Kaisha Toshiba, Kawasaki, Japan

[21] Appl. No.: 746,292

[22] Filed: Jun. 19, 1985

[30] Foreign Application Priority Data

Jun. 20, 1984 [JP] Japan ................................ 59-127199

[51] Int. Cl.[4] ................................ G01D 15/24

[52] U.S. Cl. ................................ 346/136; 346/1.1; 346/24

[58] Field of Search ................................ 346/24, 136, 1.1

[56] References Cited

U.S. PATENT DOCUMENTS

| | | | |
|---|---|---|---|
| 4,560,990 | 12/1985 | Sue et al. | 346/17 X |
| 4,562,444 | 12/1985 | Nagashima et al. | 346/76 PH |
| 4,568,950 | 2/1986 | Ross et al. | 346/76 PH |

FOREIGN PATENT DOCUMENTS

| | | |
|---|---|---|
| 3306083 | 9/1983 | Fed. Rep. of Germany . |
| 3438663 | 5/1985 | Fed. Rep. of Germany . |
| 3402067 | 8/1985 | Fed. Rep. of Germany . |
| 3509218 | 9/1985 | Fed. Rep. of Germany . |
| 3509414 | 9/1985 | Fed. Rep. of Germany . |
| 139278 | 10/1980 | Japan . |
| 31177 | 2/1984 | Japan . |
| 2082973 | 3/1982 | United Kingdom . |

*Primary Examiner*—E. A. Goldberg
*Assistant Examiner*—Gerald E. Preston
*Attorney, Agent, or Firm*—Finnegan, Henderson, Farabow, Garrett & Dunner

[57] ABSTRACT

A recording apparatus of the type using a roll of recording paper in which cutting is effected for recording paper unrolled from the roll after completion of each recording operation and thereby a part of the recording paper on which recording has been effected is cut off therefrom. The apparatus frame is constituted by a combination of casing frame and cover frame and the latter is turnably supported in the former. A recording paper holder, a cutter and one of a combination of recording head and platen roller are accommodated in the cover frame, whereas the other one of a combination of recording head and platen roller is accommodated in the cover frame. Further, the apparatus is provided with a guide plate which is located above the passage of transportation of the recording paper. The guide frame extends between the recording head or the platen roller and the cutter and it is fixedly secured to the casing frame.

7 Claims, 11 Drawing Figures

RECORDING APPARATUS AND METHOD OF TRANSPORTING RECORDING PAPER

BACKGROUND OF THE INVENTION

1. Field of the Invention

The present invention relates to a recording apparatus of the type in which recording paper is displaced by rotating a platen roller while it is clamped between the recording head and the platen roller and recording is effected on the recording paper by means of the recording head during displacing of the recording paper. Further, the present invention relates also to a method of transporting recording paper.

2. Description of the Prior Art

As is well known, a recording apparatus of the type using a roll of recording paper is so constructed that recording is effected on recording paper unrolled from the roll by means of a recording head. After completion of the recording operation of the recording paper is transported further until the rearmost end of a part of the recording paper on which recording has been effected moves past a cutter and thereafter a cutting operation is performed at the rearmost end of the recorded part of the recording paper. The renewed foremost end of the recording paper formed after completion of cutting operation is then caused to move back to the recording head. This is because of the fact that when the next recording operation is initiated while the recording paper is held in the cut-off state, the foremost end part of the recording paper, that is, the part extending between the cutter and the recording head is kept out of recording, resulting in the part of the recording paper becoming wasted. It should be noted that the foremost end part of the recording paper which has been displaced backwardly to the recording head is held in the slackened state in the area extending between the recording head and the recording paper roll.

Further, the recording apparatus of the abovementioned type using a roll of recording paper includes a casing frame and a cover frame both of which constitute an apparatus frame, and the cover frame is turnably supported in the casing frame while a platen roller is rotatably held in the cover frame. When a malfunction of clogging with recording paper takes place, the platen roller is parted away from the recording head and thereby the passage of transportation of the recording paper inclusive the recording head is exposed to the outside so as to easily remove clogged recording paper.

Incidentally, the platen roller in the conventional recording apparatus as constructed in the above-described manner is made of silicon rubber or the like material having an excellently high heat resistivity. For the reason it is liable to be charged with static electricity.

When the cover frame is turned upwardly so as to allow the recording paper passage to be exposed to the outside for the purpose of maintenance service or the like, the recording paper is raised up together with the platen roller while its fore end part is stuck to the latter under the influence of static electricity and thereafter it is parted from the platen roller when the slackened part thereof is fully stretched. Then, the recording paper falls down toward the recording paper transportation passage under the effect of gravity force of the recording paper itself but is is sometimes found that the fore end part of the recording paper is entangled with cutter, casing frame or the like in the course of falling-down. If the cover frame is restored to the original position without any corrective operation performed to eliminate the entangled state, it results that paper clogging takes place immediately after the platen roller is rotated.

SUMMARY OF THE INVENTION

Hence, the present invention has been made with the foregoing background in mind and its object resides in providing a recording apparatus as well as a method of transporting recording paper without any occurrence of paper clogging at a time of opening and closing the cover frame.

To accomplish the above object there is proposed according to one aspect of the invention a recording apparatus essentially comprising a casing frame in which a recording paper holder for ratatably holding a roll of recording paper, a recording head for carrying out recording on the recording paper unrolled from the roll and a cutter for cutting the rearmost end of a part of the recording paper on which recording has been achieved are accommodated, a cover frame in which a platen roller adapted to transport forwardly recording paper unrolled from the roll while it is brought in pressure contact with a recording head under the effect of depressing force imparted by the platen roller is accommodated, the cover frame being turnably supported in the casing frame, and a block member fixedly secured to the casing frame and disposed close to the platen roller in the area located above the passage of transportation of the recording paper between the plated roller and the cutter.

Alternatively, the recording head may be accommodated in the cover frame and the platen roller may be accommodated in the casing frame.

Further, there is proposed according to another aspect of the invention a method of transporting recording paper, the method being carried out by way of the steps of holding the foremost end of recording paper unrolled from a roll of recording paper at a waiting position located between a cutter and a block member which is disposed above the passage of transportation of the recording paper, between a recording head and a cutter, displacing backwardly the foremost end of the recording paper to the recording head in response to a recording operation starting signal, displacing forwardly toward the cutter the recording paper while recording is effected by means of the recording head, displacing the recording paper further after completion of recording operation until the rearmost end of a part of the recording paper on which recording has been effected moves past the cutter, cutting off the recorded part of the recording paper at the rearmost end thereof, displacing backwardly the renewed foremost end of the recording paper formed after completion of cutting operation to the position which is determined between the cutter and the block member, and holding the recording paper at the thus determined waiting position until the next recording operation starting signal is issued.

Other objects, features and advantages of the invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENTS

Now, the present invention will be described in a greater detail hereunder with reference to the accompanying drawings which schematically illustrate preferred embodiments thereof.

Figure 1:
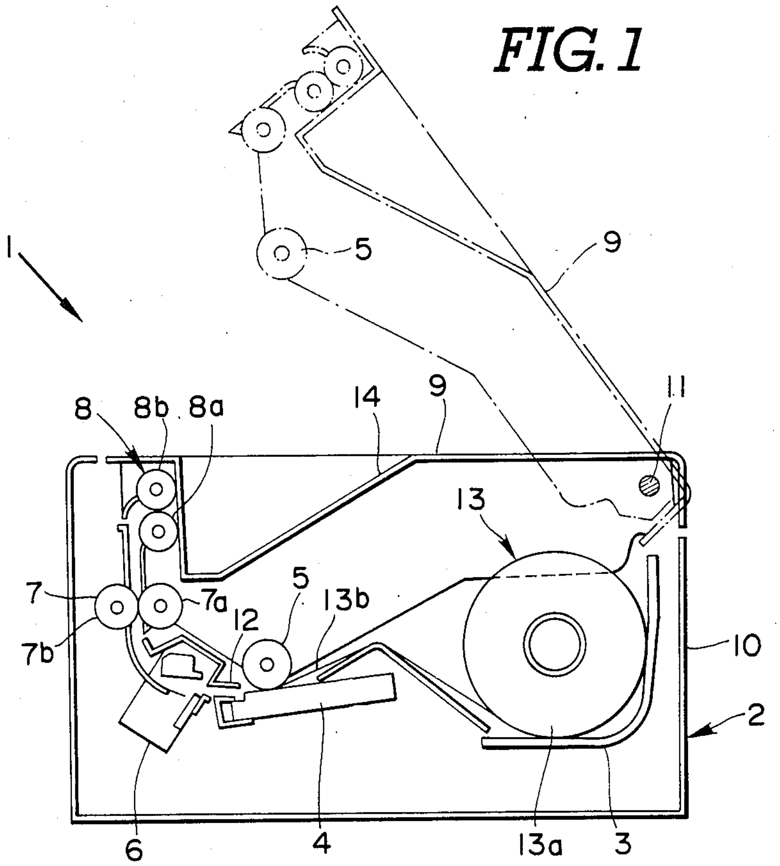
FIG. 1 is a schematic sectional front view of a recording apparatus in accordance with an embodiment of the invention.

A recording apparatus according to the invention is generally identified by reference numeral 1 in FIG. 1. The recording apparatus 1 includes a casing 2 in which a recording paper holder 3, a recording head 4, a platen roller 5, a cutter 6 and paper discharging rollers 7 and 8 are accommodated as essential components constituting the apparatus. Among them the platen roller 5, a driving roller 7*a* for the paper discharging roller 7, a driving roller 8*a* for the paper discharging roller 8 and a pinch roller 8*b* are mounted on a cover frame 9 which serves as a cover for the casing 2. The cover frame 9 is supported turnable about a pin 11 which extends across the casing frame 10 constituting an essential component of the casing 2. As is apparent from the drawing, when the cover frame 9 is set into the casing frame 10 of the casing 2 in such a manner as illustrated by real lines in FIG. 1, the platen roller 5 is brought in contact with the recording head 4 and at the same time the driving roller 7*a* comes in pressure contact with the pinch roller 7*b*. When the cover frame 9 is turned upwardly in the clockwise direction as illustrated by phantom lines in FIG. 1, the passage of transportation of recording paper is kept opened. Further, the recording apparatus 1 has a guide plate 12 as a block member fixedly secured thereto in the area located above the recording paper transportation passage. As will be best seen from FIGS. 2 to 5, the guide plate 12 extends between the platen roller 5 and the cutter 6. Since guide plate 12 is fixedly secured to the casing frame 10 as mentioned above, it can not turn in any direction together with the cover frame 9.

Figure 2:
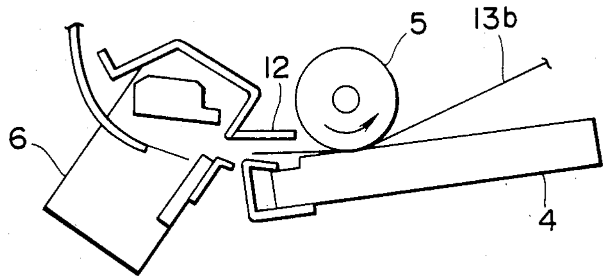
FIG. 2 is a fragmental front view of the recording apparatus in FIG. 1, particularly illustrating a part of recording paper at the waiting position.

The recording apparatus 1 is ready to start its recording operation after a series of steps of turning the cover frame 9 unwardly in the clockwise direction, loading the recording paper holder 3 with a roll of recording paper 13*a*, locating the foremost end of recording paper 13*b* unrolled from the roll 13*a* at the position as illustrated in FIG. 2 and then turning the cover frame 9 downwardly in the counterclockwise direction as seen in the drawing are completed.

Figure 6:
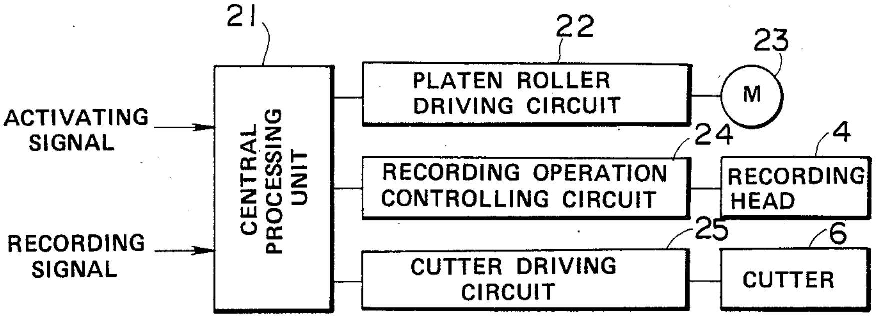
FIG. 6 is a block diagram typically illustrating a controlling system for the recording apparatus of the invention.

Next, description will be made below as to how recording paper is transported through the recording apparatus with reference to FIG. 6 which is a block diagram illustrating a control system for the recording apparatus and FIG. 7 which is a timing chart illustrating an example of controlling for recording paper transportation.

Figure 3:
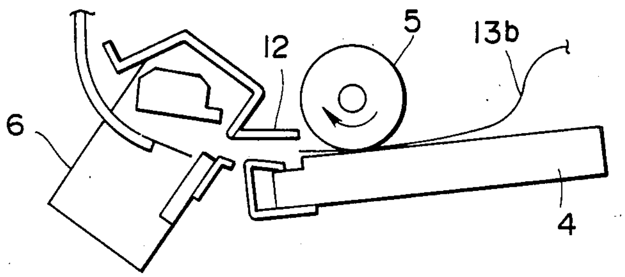
FIG. 3 is a fragmental front view of the recording apparatus in FIG. 1, particularly illustrating the recording paper in the recording operation starting state.
Figure 4:
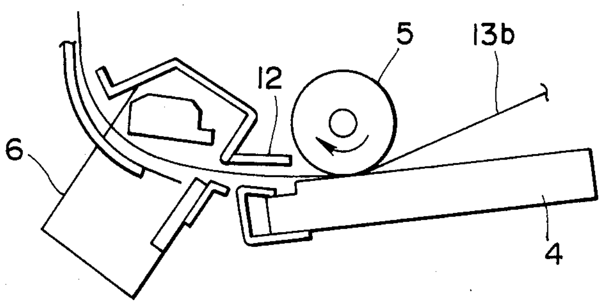
FIG. 4 is a fragmental front view of the recording apparatus in FIG. 1, particularly illustrating how essential components are arranged in the apparatus in the course of recording operation.
Figure 5:
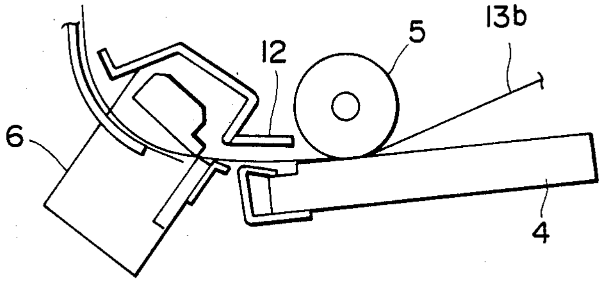
FIG. 5 is a fragmental front view of the recording apparatus in FIG. 1, particularly illustrating how the recording paper is cut off by means of a cutter.
Figure 7:
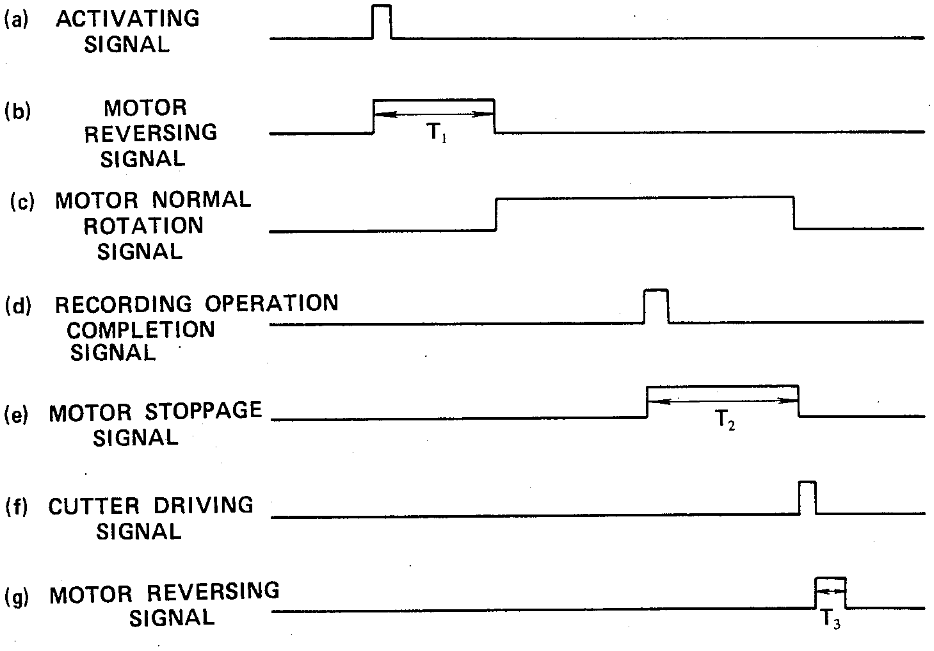
FIG. 7 is a timing chart typically illustrating controlling operations for transporting the recording paper in the recording apparatus of the invention.

Referring first to FIG. 7(*a*), an activating signal (receiving signal in the case of a facsimile apparatus) is inputted into a central processing unit 21 (hereinafter referred to simply as CPU). In response to the activating signal thus inputted into the latter a motor reversing signal is outputted from CPU 21 into a platen roller driving circuit 22 as illustrated in FIG. 7(*b*) whereby a motor 23 for the platen roller 5 is driven. A period of time $T_1$ of the motor reversing signal as mentioned above is determined long enough to allow the recording paper 13*b* to return from the waiting position as illustrated in FIG. 2 to the recording operation starting position as illustrated in FIG. 3 by rotating the platen roller 5. Accordingly, when the above-mentioned signal disappears, the foremost end of the recording paper 13*b* reaches the recording operation starting position. After the above-mentioned motor reversing signal disappears, a recording operation signal is outputted from CPU 21 into a recording operation controlling circuit 24, resulting in the recording head 4 being activated. At the same time, a motor normal rotating signal is outputted as illustrated in FIG. 7(*c*) whereby the motor 23 for the platen roller 5 is rotationally driven. Thus, recording operation is initiated at the position as illustrated in FIG. 3 and thereafter the recording paper 13*b* is transported via the cutter 6 while recording is effected. When a recording operation completion signal is inputted into CPU 21 during transportation of the recording paper 13*b* as illustrated in FIG. 7(*d*), CPU 21 is caused to output a recording operation interruption signal into the recording operation controlling circuit 24 whereby activation of the recording head 4 is interrupted. Further, in response to inputting of the above-mentioned recording operation completion signal CPU 21 outputs a signal having a period of time $T_2$ as illustrated in FIG. 7(*e*). This period of time $T_2$ is determined to such an extent as measured from generation of the recording operation completion signal until the rearmost end of the recording paper 13*b* passes through the cutter 6. When this signal disappears, rotation of the motor 23 is stopped in accordance with a command issued from CPU as illustrated in FIG. 7(*c*). This causes feeding of the recording paper 13*b* to be stopped. At this moment a cutter actuating signal is outputted from CPU into a cutter actuating circuit 25 as illustrated in FIG. 7(*f*). As a result, the cutter 6 is actuated in such a manner as illustrated in FIG. 5. A part of the recording paper 13*b* cut off in that way is discharged onto a tray 14 by rotating the paper discharging rollers 7 and 8. On the other hand, after the cutter actuating signal disappears, a motor reversing signal is outputted from CPU 21 into the platen roller driving circuit 22 as illustrated in FIG. 7(*g*) whereby the renewed foremost end of recording paper 13*b* is brought back to the position located apart from the cutter 6 by a short distance as illustrated in FIG. 2. Thereafter, a series of steps of operations as described above are repeated at every time when an activating signal is outputted.

In the above-described embodiment the time when the motor 23 starts its operation and stops the same and the time when the cutter 6 is actuated are determined with the aid of function of timers incorporated in CPU 21. However, the present invention should not be limited only to this. Alternatively, the time when components as described above start and stop their operation may be determined by processing output signals issued from a properly determined number of sensors which are disposed in the spaced relation along the passage of transportation of the recording paper 13*b* in order to detect the position of the latter.

Figure 8:
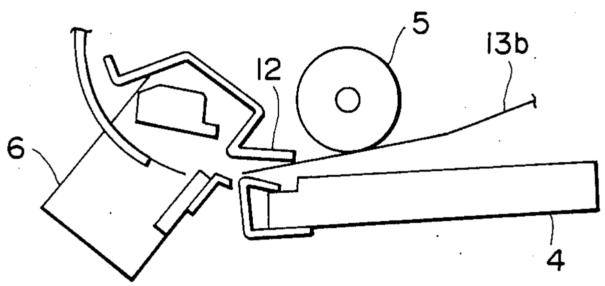
FIG. 8 is a fragmental front view of the recording apparatus in FIG. 1, particularly illustrating how the recording paper is held in the recording apparatus of the invention when the platen roller is parted away from the recording head.

According to the present invention the foremost end of the recording paper 13*b* is located away from the cutter 6 by a short distance backwardly relative to the direction of transportation of the recording paper 13*b* while the recording apparatus 1 is kept inoperative. By virtue of arrangement of the recording apparatus 1 made in that way it is assured that the foremost end part of the recording paper 13*b* is engaged to the one end of the guide plate 12 when the platen roller 5 is parted away from the recording head 4 for the purpose of maintenance service or the like, as illustrated in FIG. 8. As a result, the recording paper 13*b* is held in the passage of transportation at all time without any occurrence of dislocation of the recording paper 13*b* therefrom irrespective of how far the platen roller 5 is displaced away from the recording head 4.

Further, in the above-described embodiment the renewed foremost end of the recording paper 13*b* is caused to move back by a short distance after the latter is cut off by means of the cutter 6 and thereby the recording paper 13*b* is held in the waiting position which is determined in that way. This is because of the fact that when the foremost end of the recording paper 13*b* is held at the position located just adjacent to the cutting position there tends to take place such a malfunction that when the cutter 6 fails to function properly due to an occurrence of clogging with short strip-shaped cut pieces of the recording paper 13*b* as is often seen when the cutter 6 is actuated incorrectly or the cutting edge of the cutter 6 is easy to rust due to direct contact with coated material on the recording paper 13*b* for a long period of time, resulting in incorrect cutting being achieved.

Figure 9:
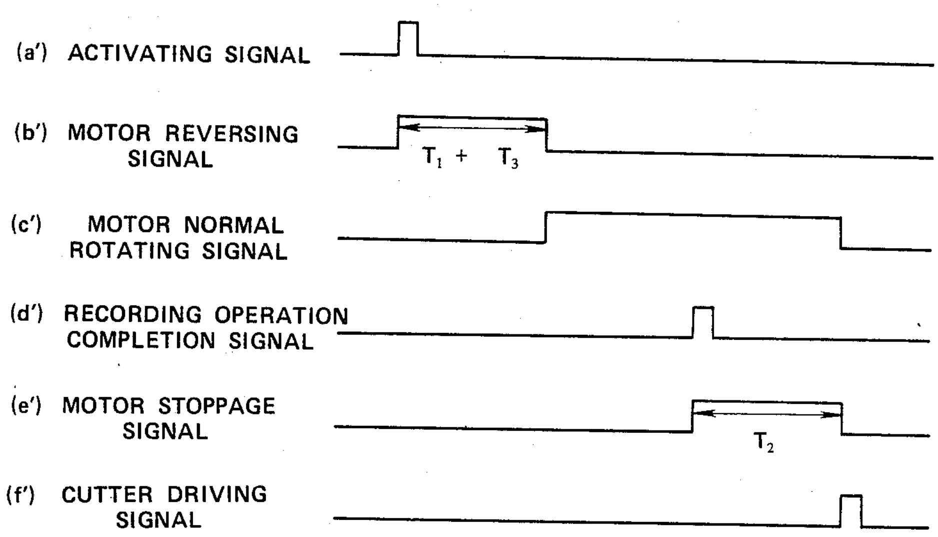
FIG. 9 is a timing chart similar to that in FIG. 7, illustrating other example of controlling operations for transporting the recording paper in the recording apparatus of the invention.

However, if there is no necessity for making an arrangement with the recording paper 13*b* in the above-described manner, the latter is not required to move back after it is cut off by means of the cutter 6. This means that after completion of cutting operation the recording paper 13*b* may be held at the cutting position. FIG. 9 is a timing chart usable for such a case. As is apparent from a comparison with the timing chart in the case as illustrated in FIG. 7, the timing chart in FIG. 9 does not have a motor reversing signal as is seen in FIG. 7(*g*) and to compensate for this the timing chart in FIG. 9 is so designed that the motor reversing signal as is seen in FIG. 7(*b*) lasts longer by a period of time $T_3$.

Figure 10:
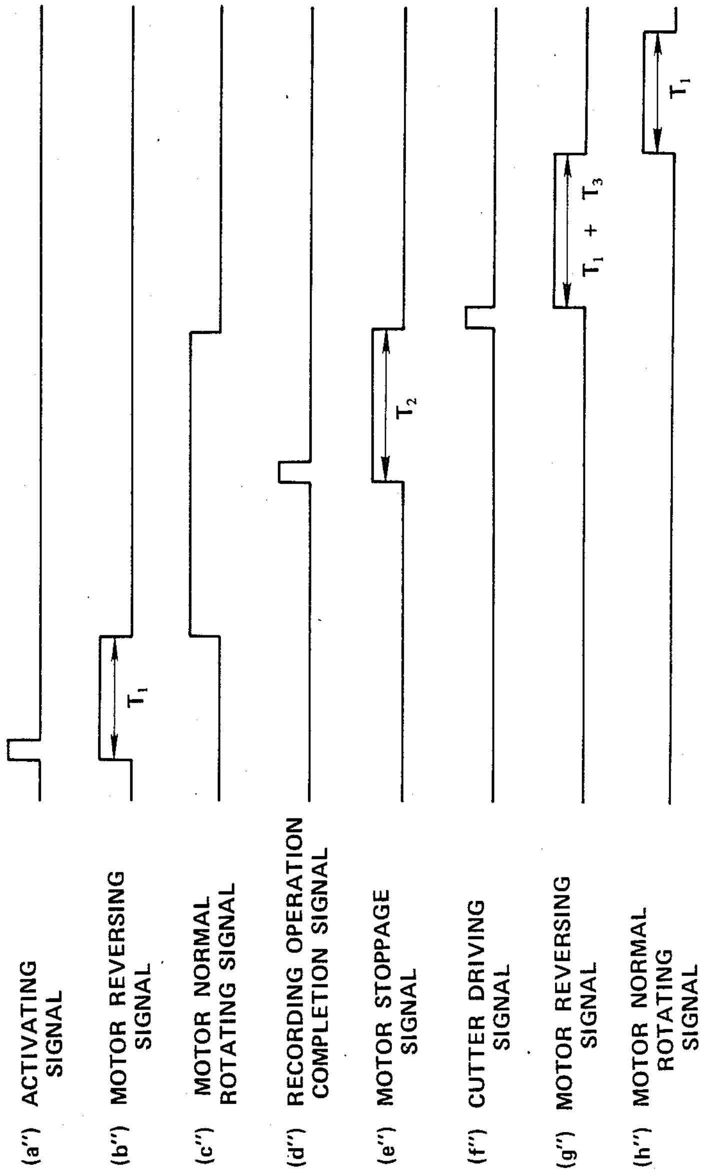
FIG. 10 is a timing chart similar to those in FIGS. 7 and 9, illustrating another example of controlling operations for transporting the recording paper in the recording apparatus of the invention.

Alternatively, an arrangement may be made such that the foremost end of the recording paper 13*b* is caused to move back to the recording head 4 after it is cut off by means of the cutter 6 and it is then transported forwardly to the waiting position for the recording paper 13*b* as described above so that it is held thereat until the next recording operation starting signal is issued. FIG. 10 illustrates a timing chart in such a case as described above. As will be apparent from this timing chart, a motor reversing signal (g'') lasts longer by a period of time $T_3$ than the period of time $T_1$ in FIG. 7(*g*). This is intended to assure a period of time required for allowing the foremost end of recording paper 13*b* cut off by means of the cutter to move back to the recording head 4. Further, the timing chart in FIG. 10 additionally inludes a motor normal rotating signal as identified by reference letter (h''). The recording paper 13*b* is caused to move forwardly to the waiting position for a period of time $T_1$ in response to the motor normal rotating signal.

Figure 11:
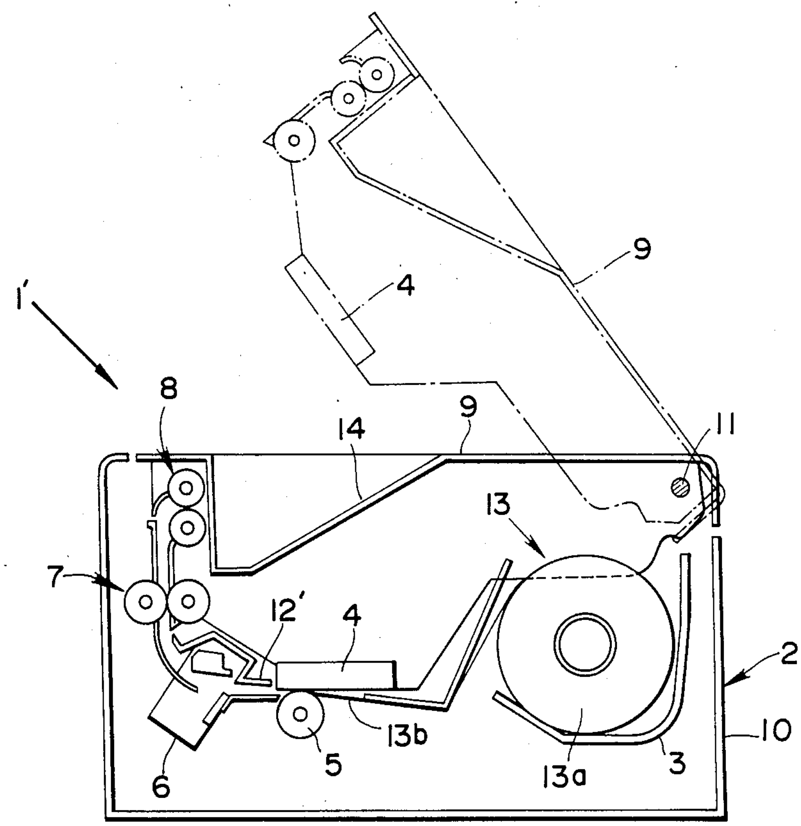
FIG. 11 is a schematic sectional front view of a recording apparatus in accordance with another embodiment of the invention.

In the above-described embodiment the recording apparatus 1 is so designed and constructed that the recording head 4 is mounted on the casing frame 10 and the platen roller 5 is mounted on the cover frame 9. However, the present invention should not be limited only to this. Alternatively, the recording apparatus 1' may be designed and constructed that the platen roller 5 is mounted on the casing frame 10 and the recording head 4 is mounted on the cover frame 9, as illustrated in FIG. 11. In the case where a heat sensitive type recording head is employed for the recording head 4 of the recording apparatus 1' as constructed in the above-described manner it is sometimes found that the recording paper 13*b* is thermally adhered to the recording head 4. When the cover frame 9 is parted away from the casing frame 10 in the event of an occurrence of thermal adhesion, the recording paper 13*b* is displaced upwardly together with the recording head 4. This is an undesirable phenomenon as is seen in the case of the recording apparatus 1 in the foregoing embodiment. In view of an occurrence of the above-mentioned phenomenon the recording apparatus 1' is provided with a guide plate 12' in the area located above the recording paper transportation passage, the guide plate 12' extending between the cutter 6 and the recording head 4, whereby the recording paper 13*b* is still held in the recording paper transportation passage even when the recording head 4 is displaced upwardly together with the cover frame 9. It should be noted that same or similar parts and components in FIG. 11 as those in FIG. 1 are identified by same reference numerals.

While the present invention has been described above only with respect to two preferred embodiments, it should of cource be understood that it should not be limited only to them and various changes or modifications may be made in any acceptable manner without departure from the spirit and scope of the invention as defined by the appended claims. For example, the block member is not limited to be a plate as in the abovementioned embodiment (guide plate 12), but any type of means may be adopted as long as they serves to prevent the upward movement of the recording paper to a certain extent when the cover frame is opened.

What is claimed is:

1. A recording apparatus comprising:

a casing frame including a recording paper holder for rotatably holding a roll of recording paper, a recording head for carrying out recording on recording paper unrolled from said roll, and a cutter for cutting the rear most end of a part of the recording paper on which recording has been achieved;

a cover frame pivotally mounted on said casing frame, said cover frame including a platen roller adapted to transport the recording paper unrolled from the roll forwardly along a recording paper path toward said cutter while the recording paper is brought in pressure contact with a recording head under the effect of a depressing force imparted by said platen roller; and a block member fixedly secured to said casing frame and disposed beside said platen roller above the recording paper path between the platen roller and the cutter.

2. A recording apparatus comprising:

a casing frame including a recording paper holder for rotatably holding a roll of recording paper, a platen roller adapted to transport recording paper unrolled from the roll forwardly along a paper path while the recording paper is brought in pressure contact with a recording head under the effect of a depressing force imparted by said platen roller, and a cutter for cutting the rearmost end of a part of the recording paper on which recording has been achieved;

a cover frame pivotally mounted on said casing frame, said cover frame including a recording head for carrying out a recording on the recording paper unrolled from the roll; and a block member fixedly secured to said casing frame and disposed beside said recording head above the recording paper path between the recording head and the cutter.

3. A recording apparatus as defined in claim 1 or 2, wherein the cover frame is pivotally supported on the casing frame so as to turn upwardly about a pin which is located at an end of the cover frame.

4. A method of transporting recording paper in a recording apparatus, said method comprising the steps of:

holding the foremost end of recording paper unrolled from a roll of recording paper at a waiting position located between a cutter and a block member, said block member being disposed above a recording paper path between a recording head and a cutter, displacing backwardly the foremost end of the recording paper to the recording head in response to a recording operation starting signal, displacing forwardly toward the cutter the recording paper while recording is effected by means of the recording head, displacing the recording paper further after completion of the recording operation until the rearmost end of a part of the recording paper on which the recording has been effected moves past the cutter, cutting off the recorded part of the recording paper at the rearmost end thereof, and holding the renewed foremost end of the recording paper formed after completion of the cutting operation at the waiting position until the next recording operation starting signal is issued.

5. A method of transporting recording paper comprising the steps of:

holding the foremost end of recording paper unrolled from a roll of recording paper at a waiting position located between a cutter and a block member, said block member being disposed above a recording paper path between a recording head and the cutter, displacing backwardly the foremost end of the recording paper to the recording head in response to a recording operation starting signal, displacing forwardly toward the cutter the recording paper while recording is effected by means of the recording head, displacing the recording paper further after completion of the recording operation until the rearmost end of a part of the recording paper on which recording has been affected moves past the cutter, cutting off the recorded part of the recording paper at the rearmost end thereof, displacing backwardly the renewed foremost end of the recording paper formed after completion of the cutting operation to the waiting position along the recording paper path that is within the range of the block member, and holding the recording paper at said waiting position until the next recording operation starting signal is issued.

6. A method of transporting recording paper as defined in claim 5, wherein the renewed foremost end of the recording paper formed after completion of cutting operation is displaced backwardly by a predetermined distance so that it is held at said waiting position.

7. A method of transporting recording paper as defined in claim 5, wherein the renewed foremost end of the recording paper formed after completion of cutting operation is displaced backwardly to the recording head and it is then displaced forwardly by a predetermined distance so that it is held at said waiting position.

* * * * *